(12) United States Patent
Kim

(10) Patent No.: US 11,583,728 B2
(45) Date of Patent: Feb. 21, 2023

(54) SYSTEM AND METHOD FOR TRACKING AND ANALYZING GOLF SHOT

(71) Applicant: Soo Ihl Kim, Los Angeles, CA (US)

(72) Inventor: Soo Ihl Kim, Los Angeles, CA (US)

( * ) Notice: Subject to any disclaimer, the term of this patent is extended or adjusted under 35 U.S.C. 154(b) by 21 days.

(21) Appl. No.: 17/012,479

(22) Filed: Sep. 4, 2020

(65) Prior Publication Data
US 2022/0072370 A1  Mar. 10, 2022

(51) Int. Cl.
*A63F 13/00* (2014.01)
*A63B 24/00* (2006.01)
*A63B 71/06* (2006.01)
*A63B 102/32* (2015.01)

(52) U.S. Cl.
CPC ...... *A63B 24/0003* (2013.01); *A63B 71/0622* (2013.01); *A63B 2071/0647* (2013.01); *A63B 2102/32* (2015.10); *A63B 2220/05* (2013.01); *A63B 2220/16* (2013.01); *A63B 2220/24* (2013.01); *A63B 2220/35* (2013.01); *A63B 2220/807* (2013.01); *A63B 2220/808* (2013.01); *A63B 2225/74* (2020.08)

(58) Field of Classification Search
CPC ........ G06V 20/44; G06V 20/42; G06V 10/48; G06V 10/147
See application file for complete search history.

(56) References Cited

U.S. PATENT DOCUMENTS

| | | | | |
|---|---|---|---|---|
| 5,798,519 | A * | 8/1998 | Vock | A63B 69/3658 250/206.1 |
| 6,093,923 | A * | 7/2000 | Vock | G01S 3/7864 250/206.1 |
| 2005/0012023 | A1* | 1/2005 | Vock | G01S 3/7864 250/206.1 |
| 2017/0262697 | A1* | 9/2017 | Kaps | G11B 27/022 |

* cited by examiner

*Primary Examiner* — David L Lewis
*Assistant Examiner* — Eric M Thomas

(57) ABSTRACT

The present invention provides system and method for tracking and analyzing golf shot, the method comprising: turning on a light source; a capturing a pair of images of the golf shot using a pair of stereo cameras having a same focal length and triggered by single signal; a analyzing a disparity between the pair of images; a producing a disparity map, a three dimension simulation, and a first motion analysis data; a capturing an image of the golf shot from before to after contact between a golf club and a golf ball using a single camera; a analyzing image sequences captured by the single camera; a producing a second motion analysis data including at least one of ball spinning, club face angle, and swing, and displaying the three dimension simulation, the image sequence, and the first and the second motion analysis data.

17 Claims, 21 Drawing Sheets

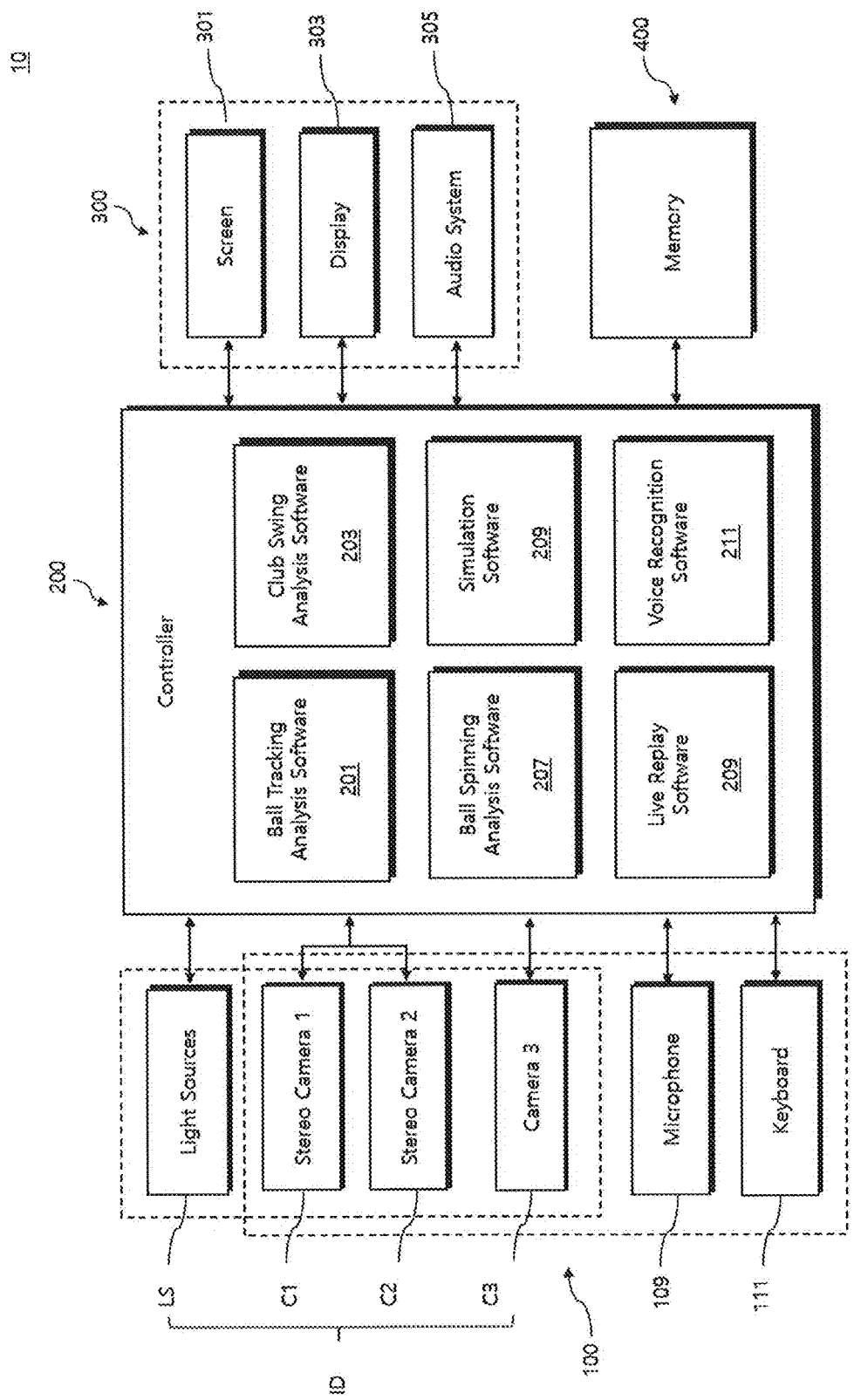

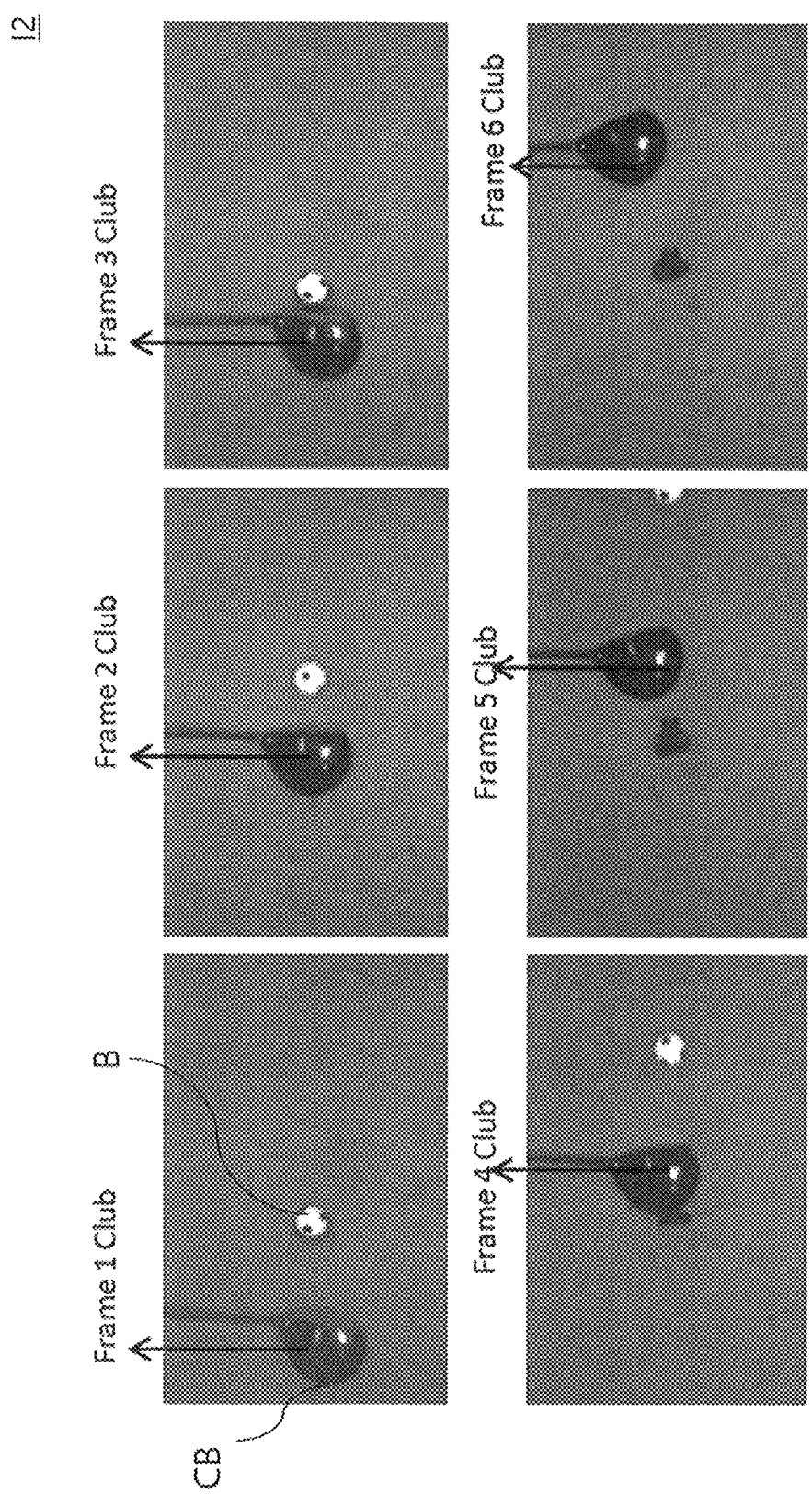

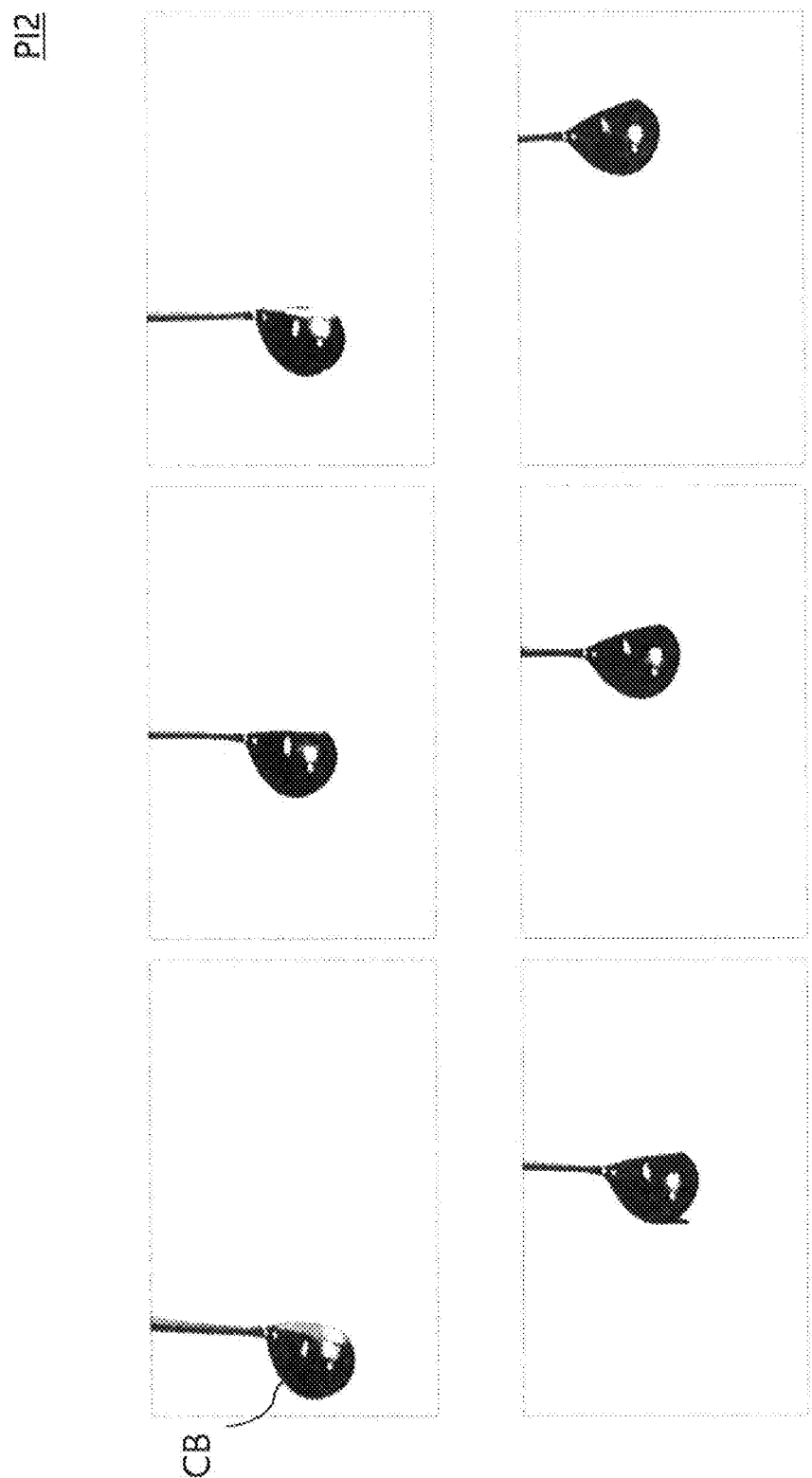

SYSTEM AND METHOD FOR TRACKING AND ANALYZING GOLF SHOT

FIELD OF THE INVENTION

The present invention pertains generally to the field of a system and a method for sport training, and more particularly to a system and a method for tracking and analyzing golf shot.

BACKGROUND OF THE INVENTION

As golf is becoming popular sport, there is an on-going interest in simple and effective ways to training and practicing golf shots for players. It is desirable for players to learn and analyze various variables of the game and train themselves to have muscle memory for the best results.

In general, golf simulation systems provide some elements of realism by using projected images from a player view after a shot has been played. However, these kinds of golf simulation systems do not provide detailed information which can affect the golf shot; thus, players lose opportunities to correct posture errors, and it is hard to sharpen their skills in the right ways.

In particular, most of ordinary systems provide simple trajectories of the golf ball after hitting even though the result of golf shot is affected by positions and directions of the club from before to after contact.

SUMMARY OF THE INVENTION

The present invention provides a system and a method for tracking and analyzing golf shot. The system and the method enable golf players to receive more accurate and detailed analysis report. In particular, the golf shot trajectory and the captured image sequence from the system to help players understand their swings better with data related to their shot from before to after contact between the golf club and the golf ball. Therefore, players can have opportunities to correct errors properly and sharpen their skills in the right ways.

Embodiments of the inventive concept provide a system for tracking and analyzing golf shot comprising: a light source emitting light having a first wavelength range; a plurality of cameras each equipped with a light filter only passing light within the first wavelength range, the cameras comprising: a first and a second stereo camera having the same focal length and triggered by single signal, and a third camera capturing from before to after contact between a golf club and a golf ball, and a controller having at least one of image analyzing processor.

In one embodiment, the image analyzing processor produces: a disparity map, a three dimension simulation, and a first motion analysis data including positions, velocities, and angles of the golf shot using images captured from the first and the second stereo camera, and image sequences and a second motion analysis data including at least one of ball spinning, club face angle, and swing using images captured from the third camera.

In one embodiment, the system further comprises a screen, the screen displays the three dimension simulation, image sequences as live replay, and the first and the second motion analysis data.

In one embodiment, the first wavelength range is within infrared light, and wherein the light filter is an infrared passing filter.

In one embodiment, the light source has a form of a flat panel comprising a plurality of light emitting devices, and wherein a direction of the flat panel is parallel to image planes of the cameras.

In one embodiment, the cameras are installed at least one place: in front of a ball hitting mat, and at a top ceiling facing the ball hitting mat in parallel.

In one embodiment, the system further comprises a golf ball, wherein the golf ball includes at least one mark on an outer surface, and the at least one mark is shown differently between one side of the golf ball from the other side from any angle.

In one embodiment, the mark is shown differently between one side and the other side by at least one of arrangement, shape, and color of the mark.

In one embodiment, the system further comprises a microphone, wherein the controller recognizes a voice command input through the microphone by a user and answers through at least one of a screen, an audio system, and other output devices.

Embodiments of the inventive concept provide a method for tracking and analyzing golf shot comprising: turning on a light source; a first capturing a pair of images of the golf shot using a pair of stereo cameras having a same focal length and triggered by single signal; a first analyzing a disparity between the pair of images; a first producing a disparity map, a three dimension simulation, and a first motion analysis data; a second capturing an image of the golf shot from before to after contact between a golf club and a golf ball using a single camera; a second analyzing image sequences captured by the single camera; a second producing a second motion analysis data including at least one of ball spinning, club face angle, and swing, and displaying the three dimension simulation, the image sequence, and the first and the second motion analysis data.

In one embodiment, the step of the first producing the disparity map and the three dimension simulation uses a following equation:

$$D = \frac{F \cdot Dcc}{Xl - Xr},$$

and wherein D is a vertical distance from the pair of cameras and a golf ball, F is focal length, Dcc is a distance between the pair of cameras, and Xl–Xr is a disparity between the pair of images.

In one embodiment, the first motion analysis data includes at least one of three dimensional positions, velocities, and angles of the golf shot.

In one embodiment, the golf ball includes at least one mark on an outer surface, wherein the mark is shown differently between one side of the golf ball from the other side from any angle, and wherein the ball spinning is calculated by position variations of the mark.

In one embodiment, the mark is shown differently between one side and the other side by at least one of arrangement, shape, and color of the mark.

In one embodiment, the step of the second producing the second motion analysis data of the club face angle and the swing includes a step of extracting a processed image representing only a pixel area of the golf club.

In one embodiment, the club face angle is calculated by measuring an angle between a shaft line of the golf club and a club face line of a head of the golf club using the processed image captured when the head is positioned just before the contact.

In one embodiment, in the step of second producing the second motion analysis data of the swing, a type of the swing is determined as in-to-in, out-to-in, or in-to-out by measuring an angle between a path of the golf club and a target line using the processed image from before the contact to after the contact.

In one embodiment, the steps of the first and the second analyzing and producing are performed through a controller, and the method further comprises controlling the controller by voice commands.

In one embodiment, the light source emits light having a first wavelength range, and wherein each of the pair of stereo cameras and the single camera is equipped with a light filter only passing light within the first wavelength range.

In one embodiment, the first wavelength range is within infrared light, and wherein the light filter is an infrared passing filter.

Although the present invention is briefly summarized, the fuller understanding of the invention can be obtained by the following drawings, detailed description, and appended claims.

BRIEF DESCRIPTION OF THE DRAWINGS

These and other features, aspects and advantages of the present invention will become better understood with reference to the accompanying drawings, wherein:

FIGS. 1a and 1b show block diagrams of golf shot tracking and analysis system 10 and 20 according to embodiments of the present invention.

FIG. 6a shows images IMGl1 and IMGr1 when a golf ball B is located in a first position BP1. FIG. 6b shows images IMGl2 and IMGr2 when a golf ball B is located in a first position BP2.

FIG. 8a shows images I1 and magnified images MI1 of the golf ball B taken from a third camera C3. FIG. 8b shows magnified images MI1 in consecutive manner, representing position variations of the marks MD1 and ML1 on the golf ball B. FIG. 8c shows additional mark-up images MMI1 of the magnified images MI1 in FIG. 8b so that the marks MD1 and ML1 are clearly shown.

FIGS. 9a and 9b are drawings to explain a step to analyze a swing in FIG. 10 and club face angle in FIG. 11. FIG. 9a shows images 12 of the golf shot taken from third camera C3. FIG. 9b shows processed images PI2 which subtracts the entire pixel area other than that of the golf club from the images 12 in FIG. 9a.

DETAILED DESCRIPTION EMBODIMENTS OF THE INVENTIONS

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as form "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1B:
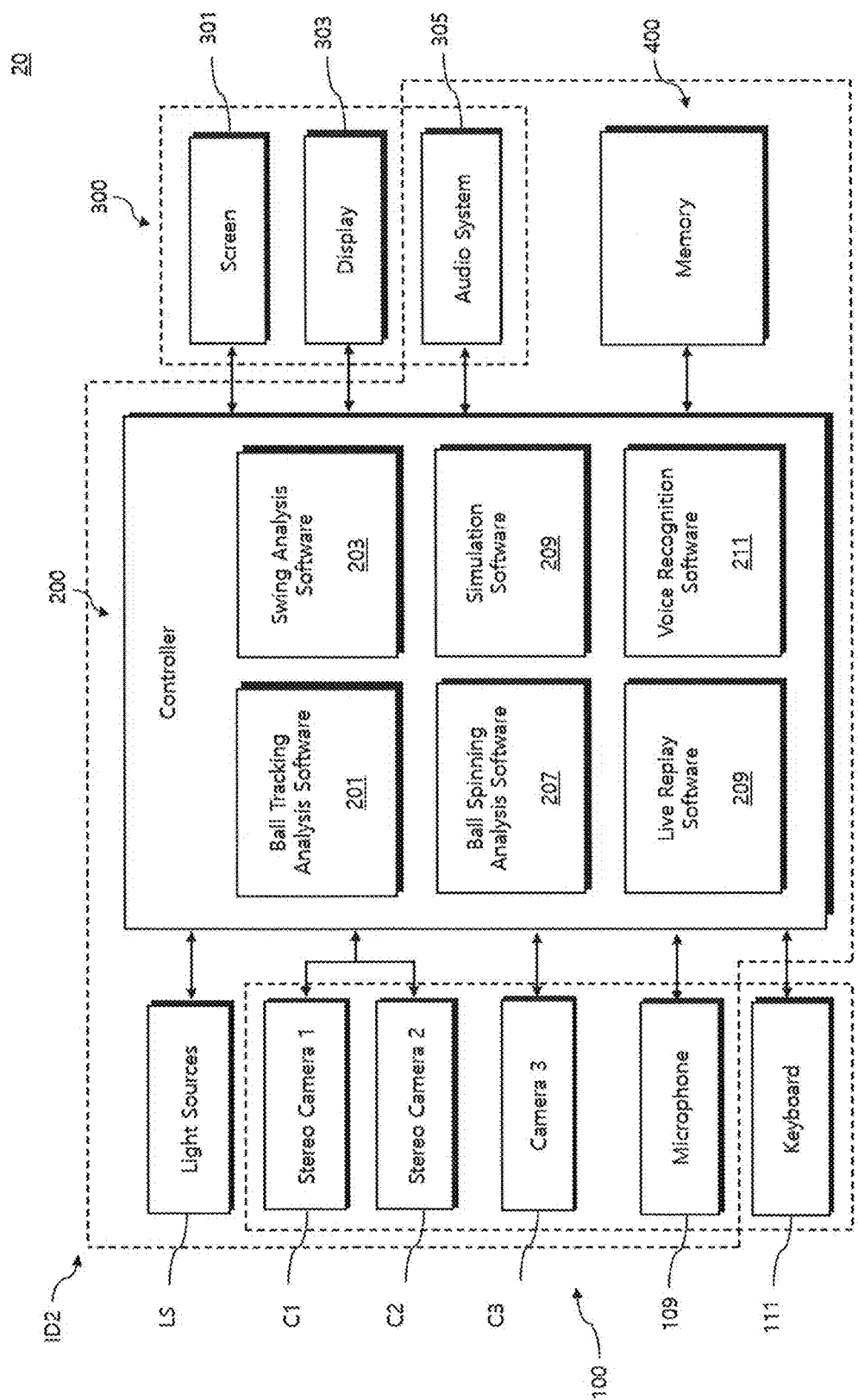
Figure 2A:
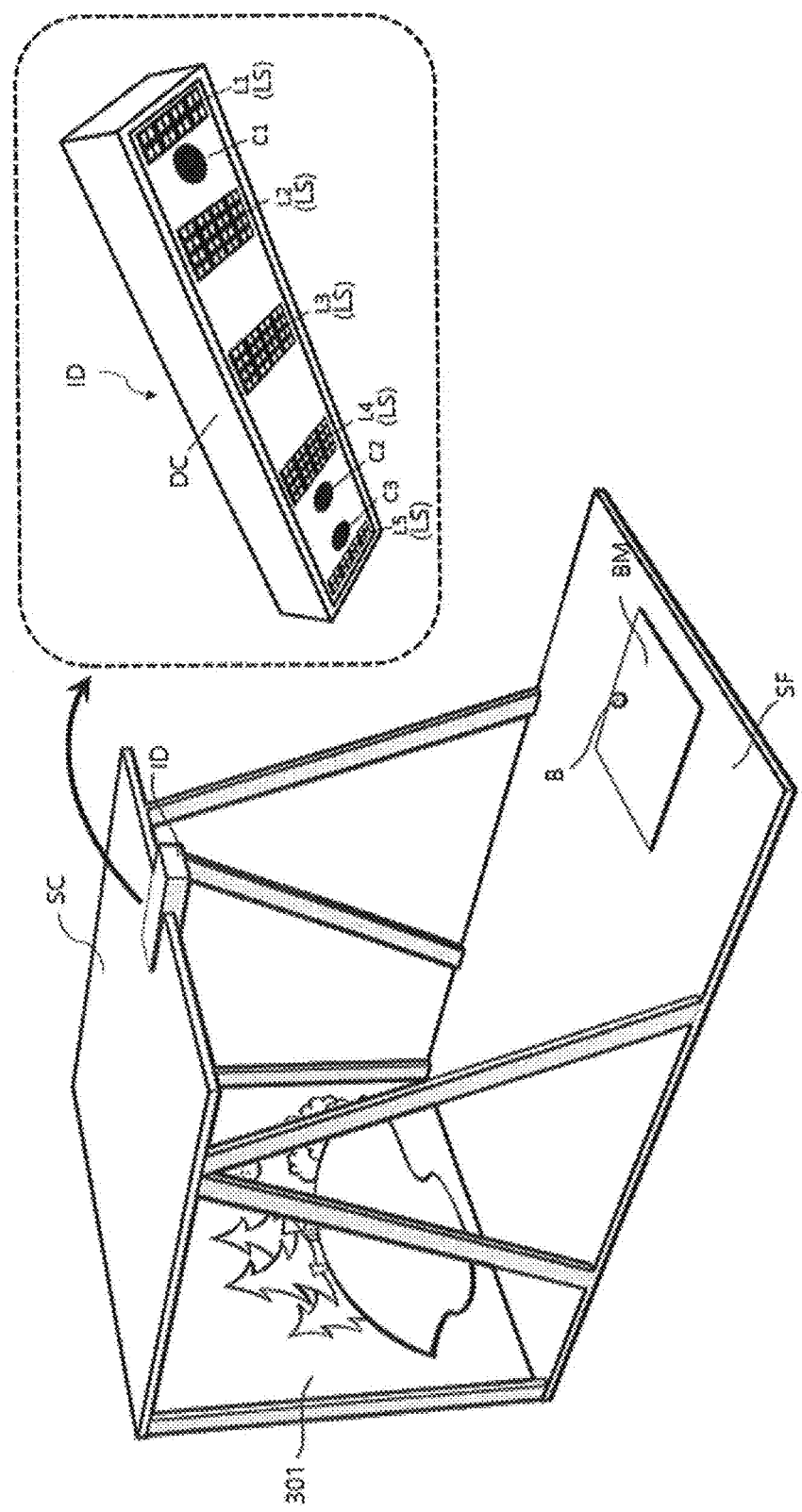
FIGS. 2a to 2c show an imaging device ID and exemplary physical placements of the imaging device ID in the golf shot tracking and analysis system 10 according to embodiments of the present invention.
Figure 2B:
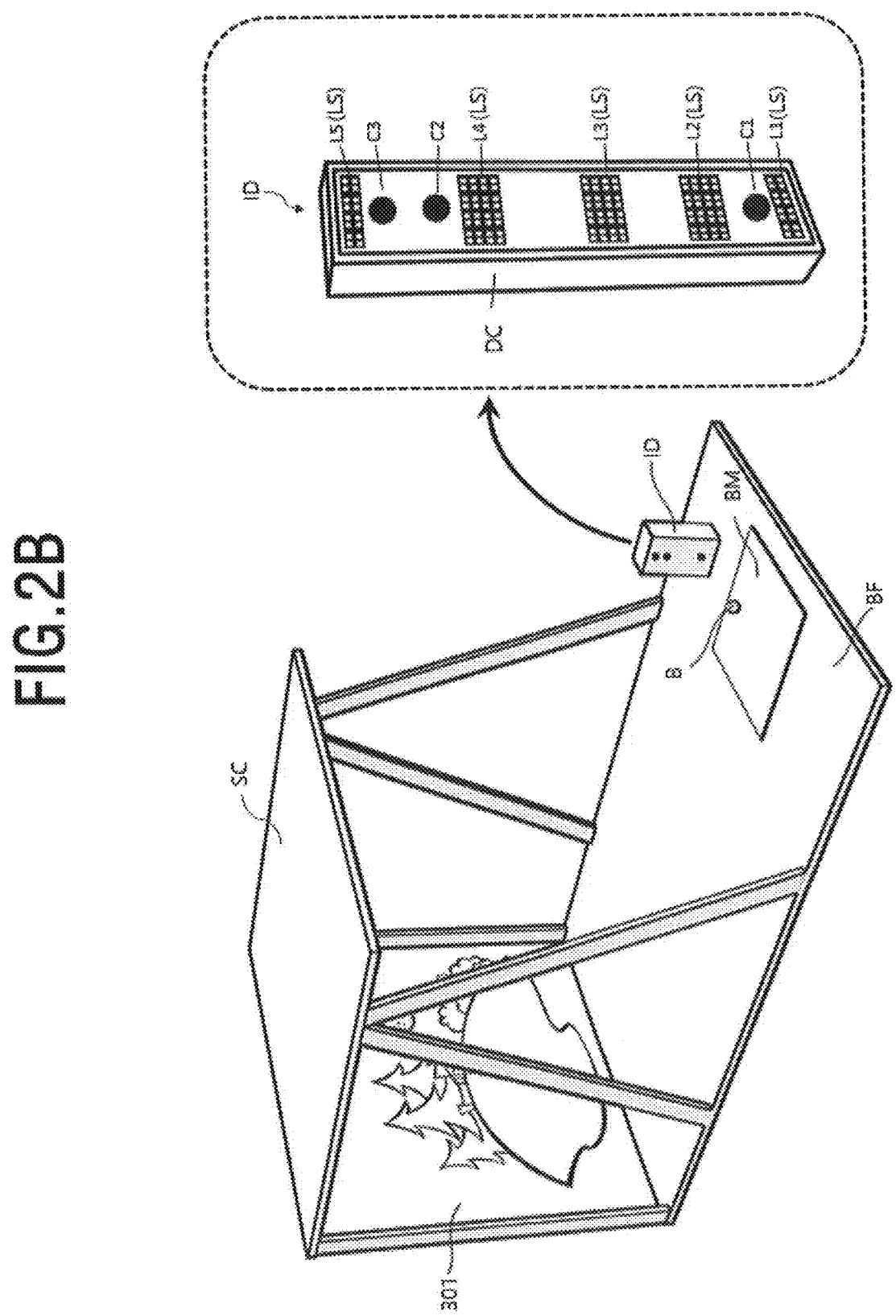
Figure 2C:
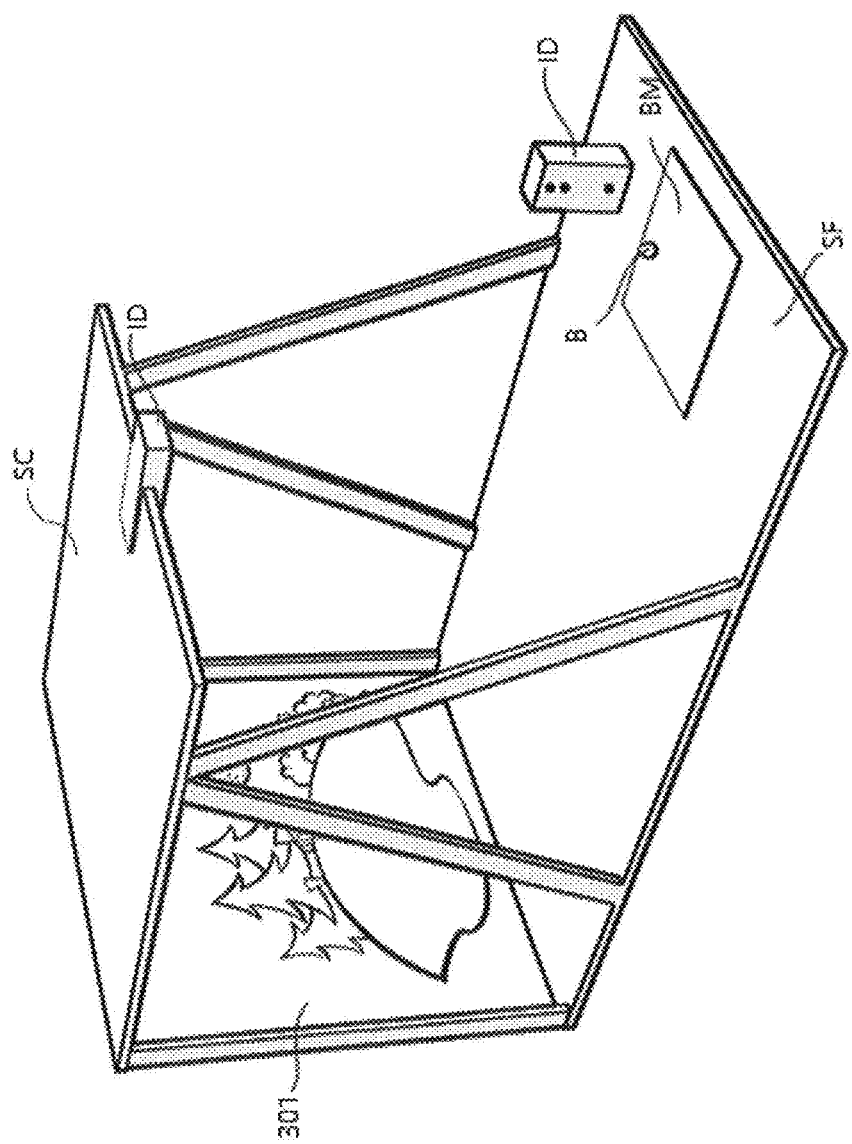
Figure 3:
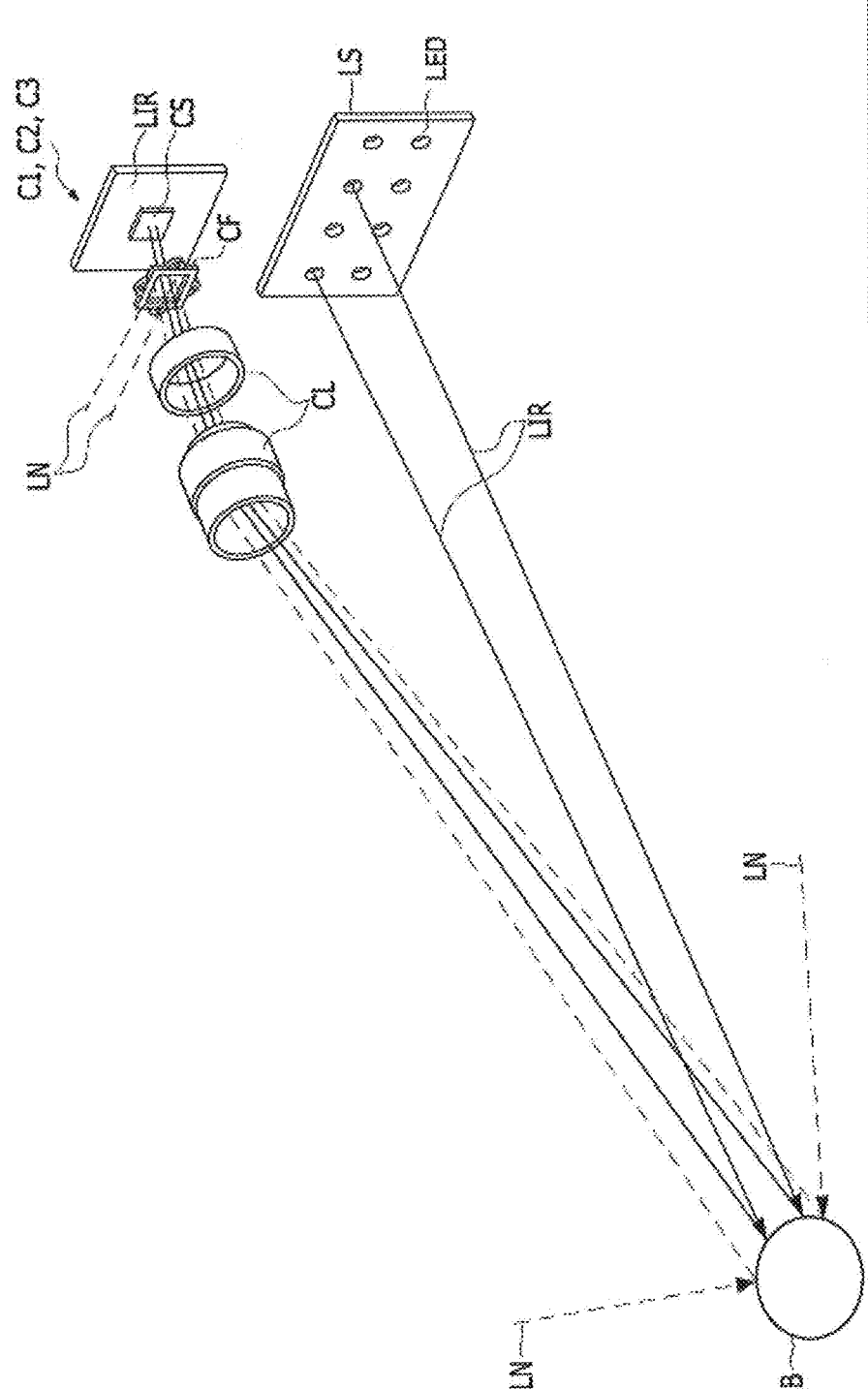
FIG. 3 shows a detailed structure of a light source LS in the golf shot tracking and analysis system 10 according to one embodiment of the present invention.

FIGS. 1a and 1b show block diagrams of the golf shot tracking and analysis systems 10 and 20 according to embodiments of the present invention. FIGS. 2a to 2c show an imaging device ID and exemplary physical placements of the imaging device ID in the golf shot tracking and analysis system 10 according to embodiments of the present invention. FIG. 3 shows the detailed structure of the light source LS in the golf shot tracking and analysis system 10 according to one embodiment of the present invention.

According to FIG. 1a, the golf shot tracking and analysis system 10 may comprise an imaging device ID, input devices 100, a controller 200, output devices 300, and a memory 400.

The imaging device ID comprises multiple cameras C1, C2, C3 and a light sources LS. The multiple cameras C1, C2, C3 may comprise a pair of stereo cameras C1, C2 and a single camera C3. Referring to FIGS. 2a to 2c together, the pair of stereo cameras C1, C2 may be set far from each other in the imaging device ID to perform depth analysis and to produce disparity map and three dimension simulation using two images from the pair of stereo camera C1, C2. The specific steps to produce 3D simulation will be described later in more detail referring to FIGS. 5 to 7d. The single camera C3 may be located in a place close to any one of the stereo cameras C1, C2 but is not limited to.

Referring to FIG. 3 together, the light source LS has a form of a flat panel comprising a plurality of light emitting devices LED. A direction of the flat panel of the light source LS may be parallel to image planes of the cameras C1, C2, C3. The image planes of the cameras C1, C2, C3 will be explained later referring to FIGS. 6a and 6b.

Specifically, the light sources LS may comprise multiple light panels L1, L2, L3, L4, L5. Each of the light panels L1, L2, L3, L4, L5 may comprise an array of multiple light emitting devices LED which emit infrared light $L_{IR}$. As infrared light $L_{IR}$ from the light panels L1, L2, L3, L4, L5 are different wavelengths from that of noise light $L_N$ from other light sources, such as visible light, the cameras C1, C2, C3 equipped with an infrared pass filter CF can capture images without interference of the noise light $L_N$. Accordingly, the captured images are not affected by noise light $L_N$ from random direction; therefore, the captured images can have clear and bright image quality and at the same time, can be analyzed more correctly.

Also, the infrared light may help the camera C1, C2, C3 keep images having a great brightness and contrast in range while the cameras C1, C2, C3 have short exposure to reduce motion blur. As shown in FIG. 3, each of camera C1, C2, C3 may have the structure comprising an imaging sensor CS, an infrared pass filter CF, and at least one of lens CL. The imaging sensor CS may be infrared light sensor which can detect only infrared light; however, the present invention is not limited to it.

In another embodiment, the light sources LS emit light having a first wavelength range, and each of the camera C1, C2, C3 is equipped with a light filter only passing light within the first wavelength range.

The pair of stereo cameras C1, C2 can be used to track the golf ball in three dimensions, and the single camera C3 to track a club head, a club shaft, a swing, a golf face angle, and ball spinning. Data from each of the pair of stereo camera C1, C2 and the single camera C3 are analyzed in views of different variables affecting the golf shot. Accordingly, a player can receive more accurate and detailed analysis report, have opportunities to correct errors properly, and sharpen their skills in the right ways. The operation of the stereo cameras C1, C2 will be described later in more detail referring to FIGS. 5 to 7d, and that of single camera C3 referring to FIGS. 2, and 8a to 11.

The input devices 100 may further comprise a microphone 109 and a keyboard 111 other than the multiple cameras C1, C2, C3. The microphone 109 can be used to transmit voice commands to the system 10. The microphone 109 can be inbuilt inside the imaging device ID but is not limited to. The keyboard 111 can be used to transfer commands to the system 10.

The image data collected from the different cameras C1, C2, C3 are sent to the controller 200.

The controller 200 may be implemented by software and/or firmware executed by at least one of processor. The processor can be microcomputers, signal processors, integrated circuits, and other analog and/or digital circuits but not limited to.

Specifically, the controller 200 comprises at least one of image analysis software including image processing function to provide analysis report regarding each of the golf ball and the club in view of various variables. For example, the controller 200 may comprise a ball tracking analysis software 201, a swing analysis software 203, and a ball spinning analysis software 207.

Also, the controller 200 comprises a simulation software 209 to display the three dimension trajectory of the golf ball based on the data from the ball tracking analysis software 201, the swing analysis software 203, and the ball spinning analysis software 207. The operation of the live replay will be described later in more detail referring to FIG. 12. The controller 200 also includes a live replay software 209 to display the image sequence captured from the single camera C3. The operation of the live replay will be described later in more detail referring to FIG. 13.

The controller 200 also comprise voice recognition software 211 to receive voice commands from the player. The operation of the voice recognition will be described later in more detail referring to FIG. 14.

The controller 200 may be connected to the output devices 300 such as a screen 301, a monitor display 303, and an audio system 305. The screen 301 can display a three dimension golf course, a trajectory of the golf ball on the golf course, an analyzed details such as 3D positions, velocities, angles, directions of the golf ball in the trajectory. The monitor display 303 may be used to monitor each element of the system 10. Also, the live replay software 209 can show the live video through the monitor display 303. The audio system 305 can be used to transmit notification from the system 10.

The memory 400 may comprise a program memory and an image story memory for use by the controller 200. The image story memory of the memory 400 may be a nonvolatile writable memory for storing images captured by the pair of stereo cameras C1, C2 and the single camera C3.

The imaging device ID, the input devices 100, the controller 200, the output devices 300, and the memory 400 can be connected to each other through various means such as a USB cable, wireless Bluetooth, an electrical line, etc.

In embodiment of FIG. 1a, the imaging device ID comprises only multiple cameras C1, C2, C3 and a light sources LS, but the present invention is not limited to. According to another embodiment of the present invention, referring to FIG. 1b, an imaging device ID2 of a golf shot tracking and analysis system 20 may comprise the microphone 109, the controller 200, the audio system 305, and the memory 400 as well as the cameras C1, C2, C3 and the light sources LS.

Referring to FIGS. 2a, 2b, 2c, the imaging device ID may be installed at least one place. In one embodiment of FIG. 2a, the imaging device ID is placed at a top ceiling SC which faces a ball hitting mat BM and/or the floor SC in parallel. In another embodiment of FIG. 2b, the imaging device ID is placed in front of the ball hitting mat BM on which a golf ball B is placed. In another embodiment of FIG. 2c, each of two imaging devices ID is placed in front of the ball hitting mat BM and at the top ceiling SC, respectively.

The golf shot tracking and analysis systems 10, 20 are the embodiments of the present invention and the inventive concept of the present invention is not limited to the structure described above. For example, the imaging device ID may further include more than three cameras.

Figure 4:
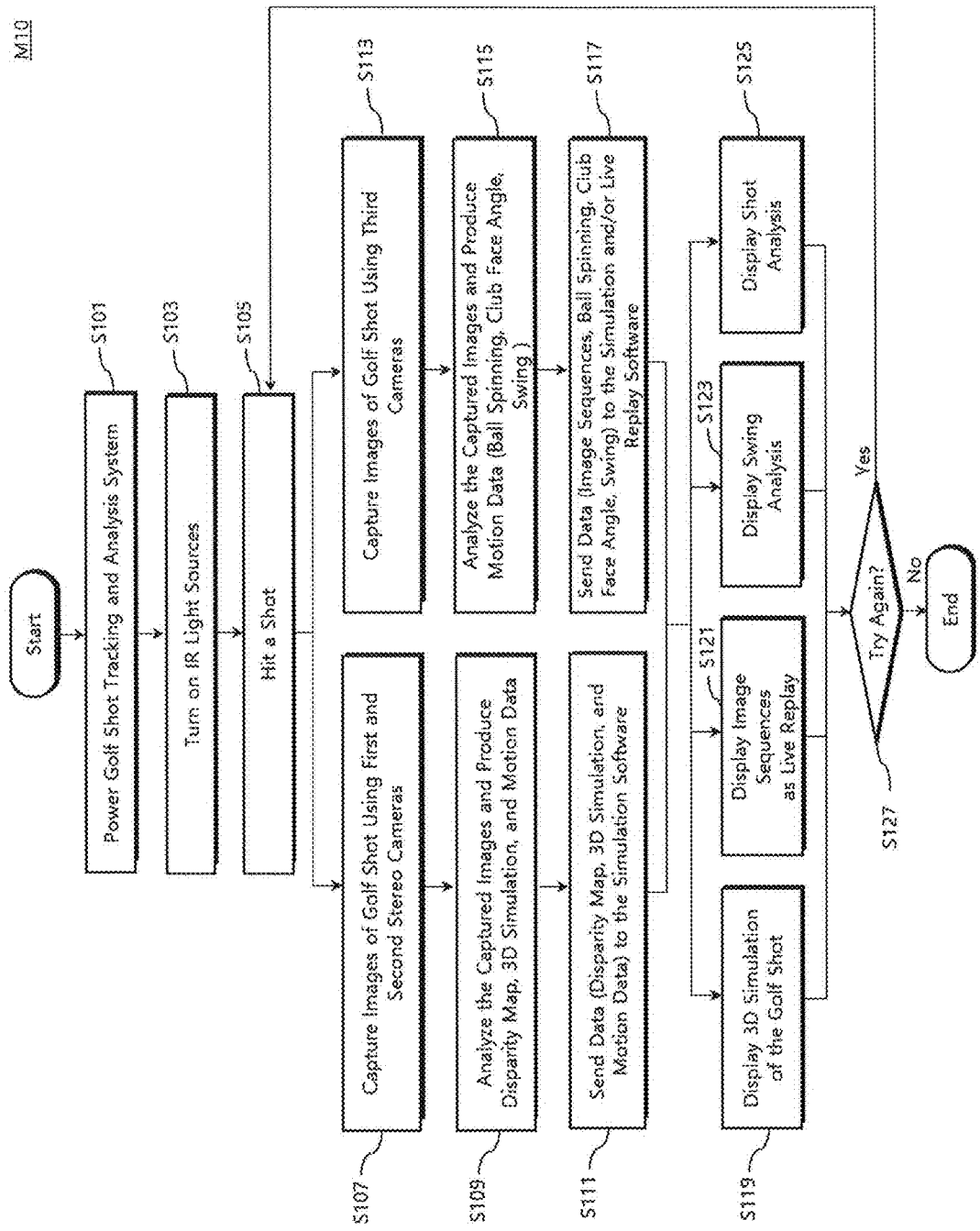
FIG. 4 shows a flow chart of a method M10 for tracking and analyzing a golf shot according to one embodiment of the present invention.

FIG. 4 shows a flow chart of a method M10 for tracking and analyzing the golf shot according to one embodiment of the present invention. The method M10 can be performed using the system 10 or 20 described before. Hereafter, the pair of stereo cameras C1, C2 are referred to as a first stereo camera C1 and a second stereo camera C2, respectively. Also, the single camera C3 will be referred to as a third camera C3.

Referring to FIG. 4, a user powers on the golf shot tracking and analysis 10 and turns on the light sources LS S101, S103. When the light sources LS are turned on, the cameras C1, C2, C3 are in a capturing mode.

Figure 5:
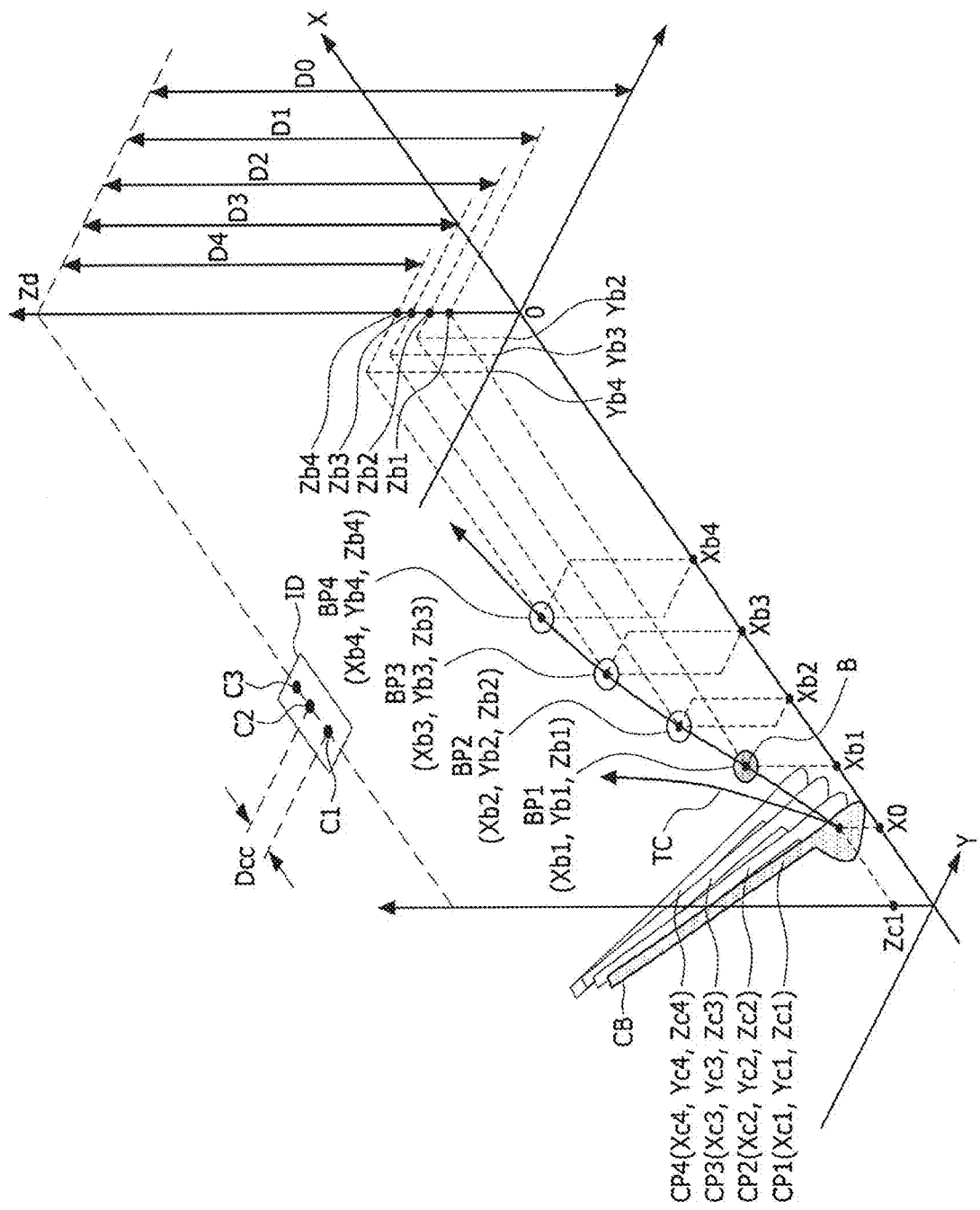
FIG. 5 shows an actual trajectory of the golf shot and coordinate values of the golf shot determined from the golf shot tracking and analysis system 10 according to one embodiment of the present invention.

The user places the golf ball B on the ball hitting mat BM and then hits the golf ball B S105. FIG. 5 shows an actual trajectory Tb of the golf ball B and coordinate values (X, Y, B) of the golf shot determined by the golf shot tracking and analysis system 10 and method M10.

When a predetermined timing or event is occurred, the camera C1, C2, C3 begin capturing images of the golf shot S107.

Specifically, both the first and the second stereo camera C1, C2 keep capturing images by single trigger; therefore, the pair of images from the first and the second stereo camera C1, C2 can be used to produce single stitched image or single three dimensional image in every frames. To achieve three dimension image and/or simulation, the golf shot tracking and analysis systems 10 needs to perform depth analysis and produce disparity map. For this step, the images captured from the camera C1, C2 are sent to the controller 200.

Figure 6A:
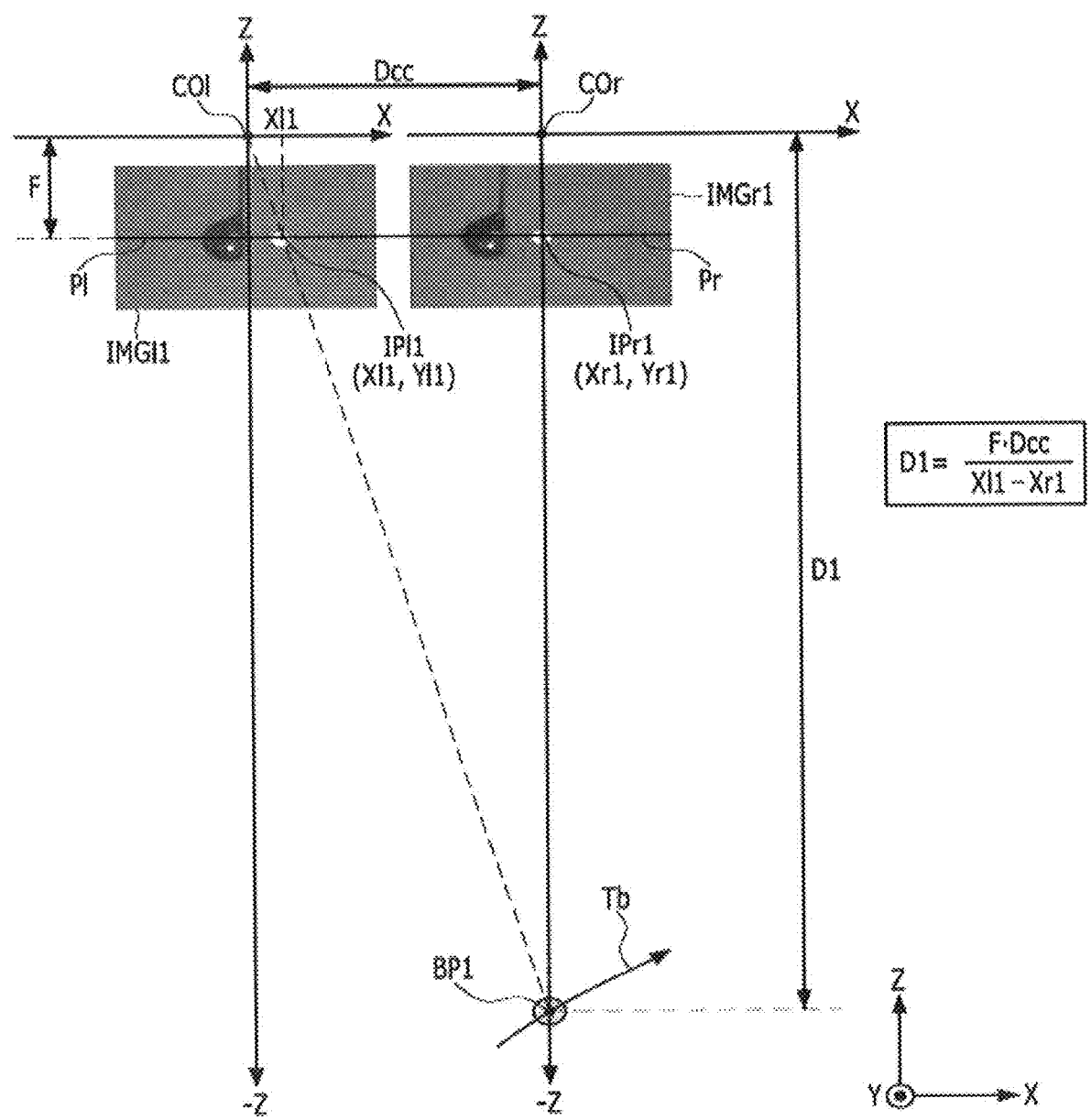
FIGS. 6a and 6b are drawings to explain a step to calculate the depth of the image subjects and produce a disparity map using a difference between the two images respectively captured from stereo cameras C1 and C2 according to one embodiment of the present invention.
Figure 6B:
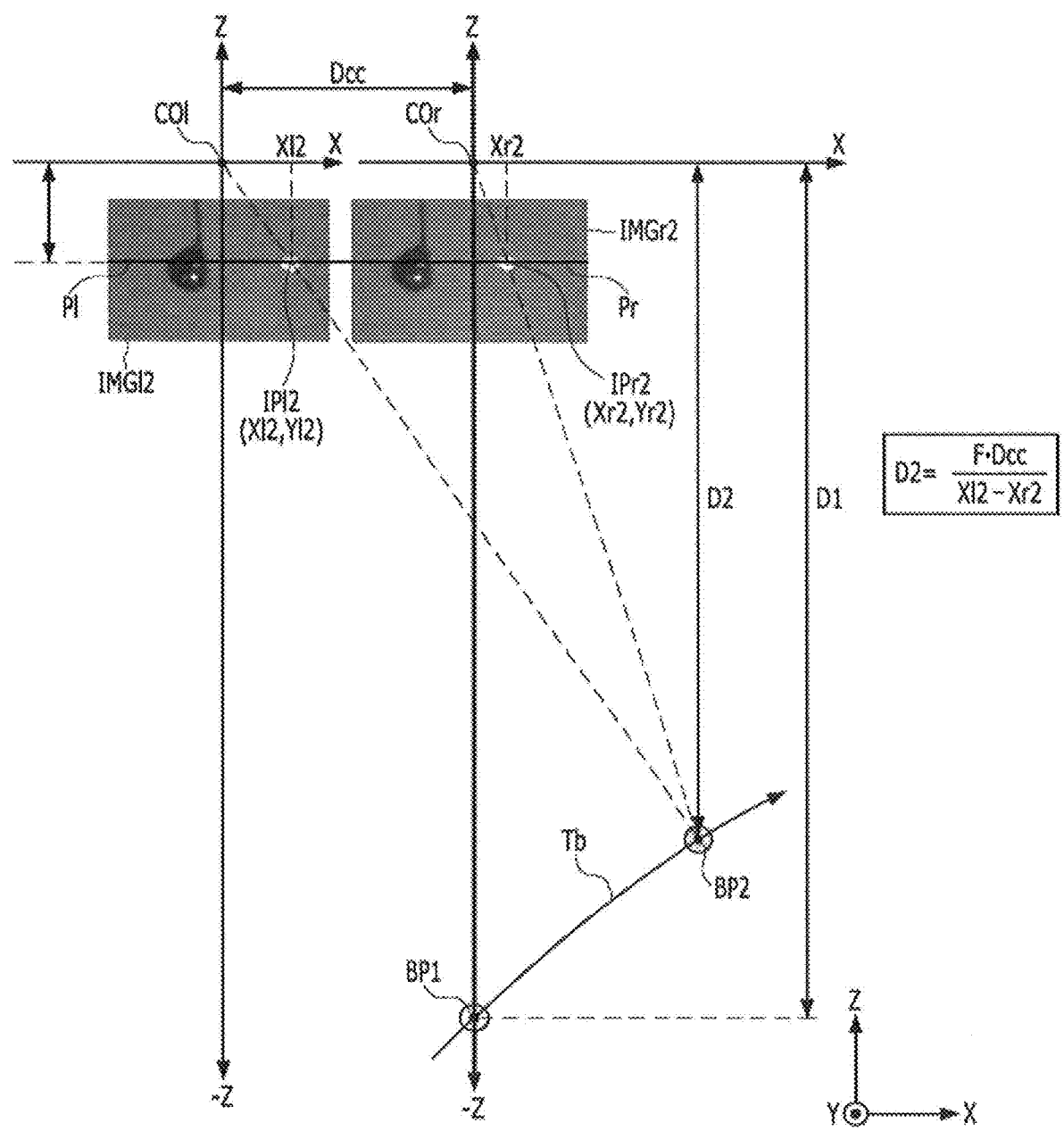

FIGS. 6a and 6b are drawings to explain a step to calculate the depth of the subjects and produce the disparity map using a difference between the two images respectively captured from the first and second stereo camera C1 and C2. Captured images the first and second stereo camera C1 and C2 are sent to the controller 200, and the analysis of the depth, the disparity map, and the three dimension simulation can be performed in the ball tracking analysis software 201 of the system 10.

FIG. 6a shows images IMGl1 and IMGr1 captured from the first and the second stereo camera C1, C2, respectively when a golf ball B is located in a first position BP1. Likewise, FIG. 6b shows images IMGl2 and IMGr2 captured from the first and the second stereo camera C1, C2, respectively when a golf ball B is located in a first position BP2.

Referring to FIGS. 5 and 6a, the first stereo camera C1 is placed in left side while the second stereo camera C2 is placed in right side. An optical center CO1 of the first stereo camera C1 and the optical center CO2 of the second stereo camera C2 are a certain distance Dcc away from each other. Optical axes of the first the second stereo camera C1 and C2 are parallel; accordingly, the first image plane Pl from the first stereo camera C1 and the second image plane Pr are also parallel. In addition, as each of the first and the second stereo camera C1, C2 has the same focal length F, each of the first and the second image plane Pl and Pr is placed at the same distance from each camera C1, C2.

When the golf ball B is positioned at a first position BP1 (Xb1, Yb1, Zb1), each of the first and the second stereo camera C1, C2 captures the same scene, and the first stereo camera C1 produces a first image IMGl1 while the second stereo camera C2 produces a second image IMGr1. Due to different position of the camera C1, C2, a golf ball position IPl1 (Xl1, Yl1) in the first image IMGl1 is different from a golf ball position IPr1 (Xr1, Yr1) in the second image IMGr1. A position difference of the golf ball B shown in the first and the second image IMGl1, IMGr1 is a disparity Xl1−Xr1.

Accordingly, a depth D1, or distance, from the first and the second stereo camera C1, C2 can be calculated as following equation:

$$D = \frac{F \cdot Dcc}{Xl1 - Xr1}$$

Likewise, referring to FIG. 6b together, when the golf ball B is positioned at a second position BP2 (Xb2, Yb2, Zb2) according to progress of the golf ball B. The first stereo camera C1 produces a first image IMGl2 while the second stereo camera C2 produces a second image IMGr2. Due to different position of the camera C1, C2, a golf ball position IPl2 (Xl2, Yl2) in the first image IMGl2 is different from a golf ball position IPr2 (Xr2, Yr2) in the second image IMGr2. A position difference of the golf ball B shown in the first and the second image IMGl2, IMGr2 is a disparity Xl2−Xr2.

Accordingly, a depth D2, or distance, from the first and the second stereo camera C1, C2 can be calculated as following equation:

$$D = \frac{F \cdot Dcc}{Xl2 - Xr2}$$

As the golf ball B progresses and becomes closer to the camera C1, C2, the disparity in two images from the stereo camera C1, C2 becomes larger, and the depth D1, D2 from the camera C1, C2 becomes shorter.

In this way, the ball tracking analysis software 201 can obtain depth of each frame from the first and the second stereo camera C1, C2. the ball tracking analysis software 201 also can produce disparity maps with these depth data of the frame as FIGS. 7a to 7d.

FIGS. 7a to 7d are disparity maps DM1 to DM4 of the golf shot in FIG. 5 according to progress of the golf ball B. Disparity map represents a depth of the scene.

Figure 7A:
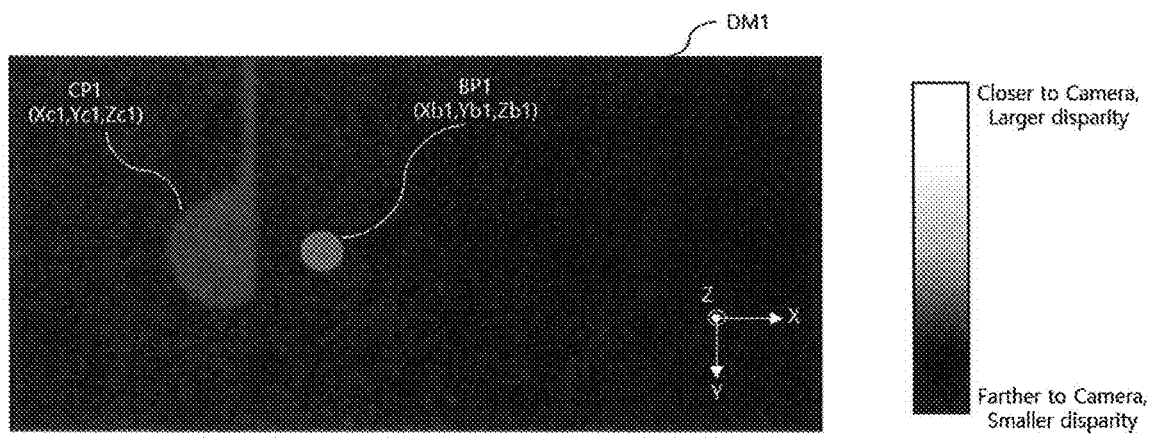
FIGS. 7a to 7d are disparity maps DM1 to DM4 of the golf shot.
Figure 7B:
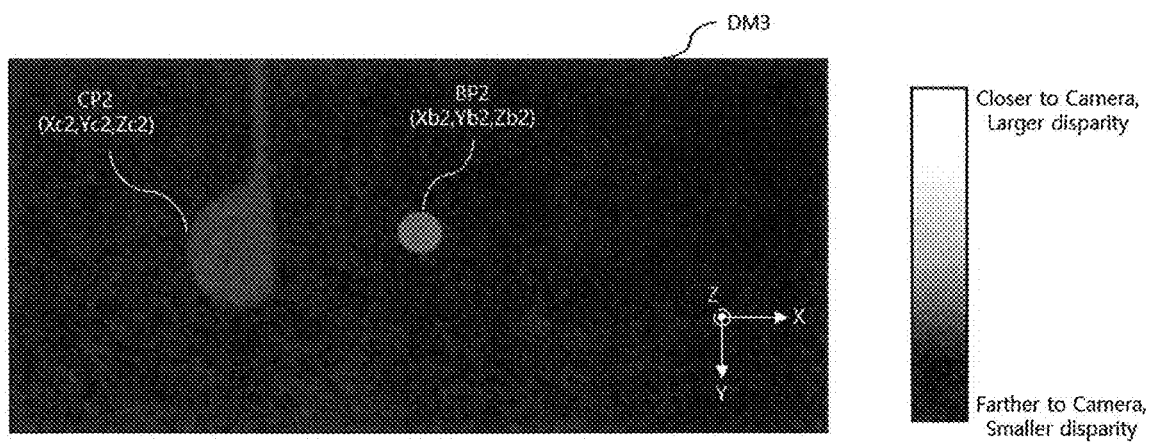
Figure 7C:
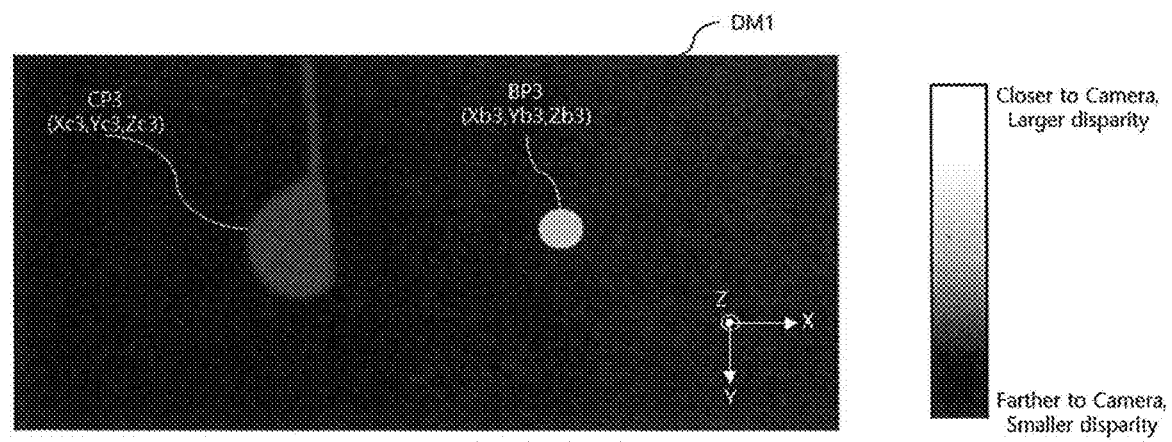
Figure 7D:
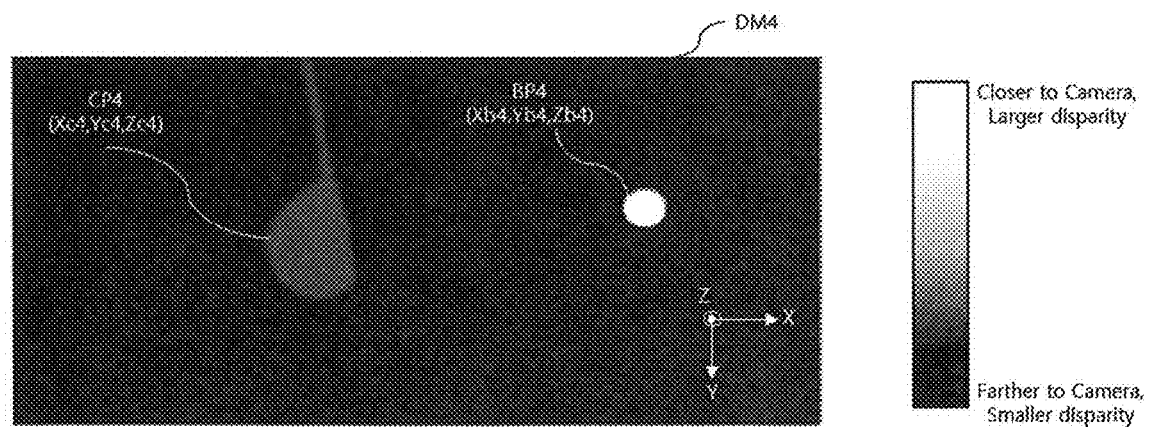

Referring to FIG. 5 together, FIG. 7a is a disparity map when the golf ball is the first position BP1 (Xb1, Yb1, Zb1). FIG. 7b is a disparity map when the golf ball is the second position BP1 (Xb1, Yb1, Zb1). FIG. 7c is a disparity map when the golf ball is the third position BP1 (Xb3, Yb3, Zb3). FIG. 7d is a disparity map when the golf ball is the fourth position BP4 (Xb4, Yb4, Zb4).

The larger disparity images have the brighter color. In FIG. 7a, the club CB is farther from the camera C1, C2 than the golf ball B; therefore, the club CB is shown in dark gray color while the golf ball B is shown in bright gray color. Likewise, as the background is farther from the camera C1, C2 than the club CB; therefore, the background is shown in almost black color.

Referring to FIGS. 7a to 7d together in consecutive order, as the golf ball B progresses and the depth becomes short, the pixel areas of the golf ball B become brighter. Based on these depth data, plane positions data, and frame time, Ball Tracking Analysis Software 201 can obtain three dimensional position, three dimensional velocity, and vertical and horizontal angle.

The data such as disparity maps and 3D position and speed are sent to the simulation software S111. The data also can be stored in the memory 400.

While the first and the second stereo camera C1, C2 begin operating S107, the third camera C3 also begins capturing images of the golf shot S113. In another embodiment, the first and the second stereo camera C1, C2 may trigger the third camera C3.

The images from the third camera C3 can be analyzed and produce ball spinning, club face angle, and club swing data S115.

Figure 8A:
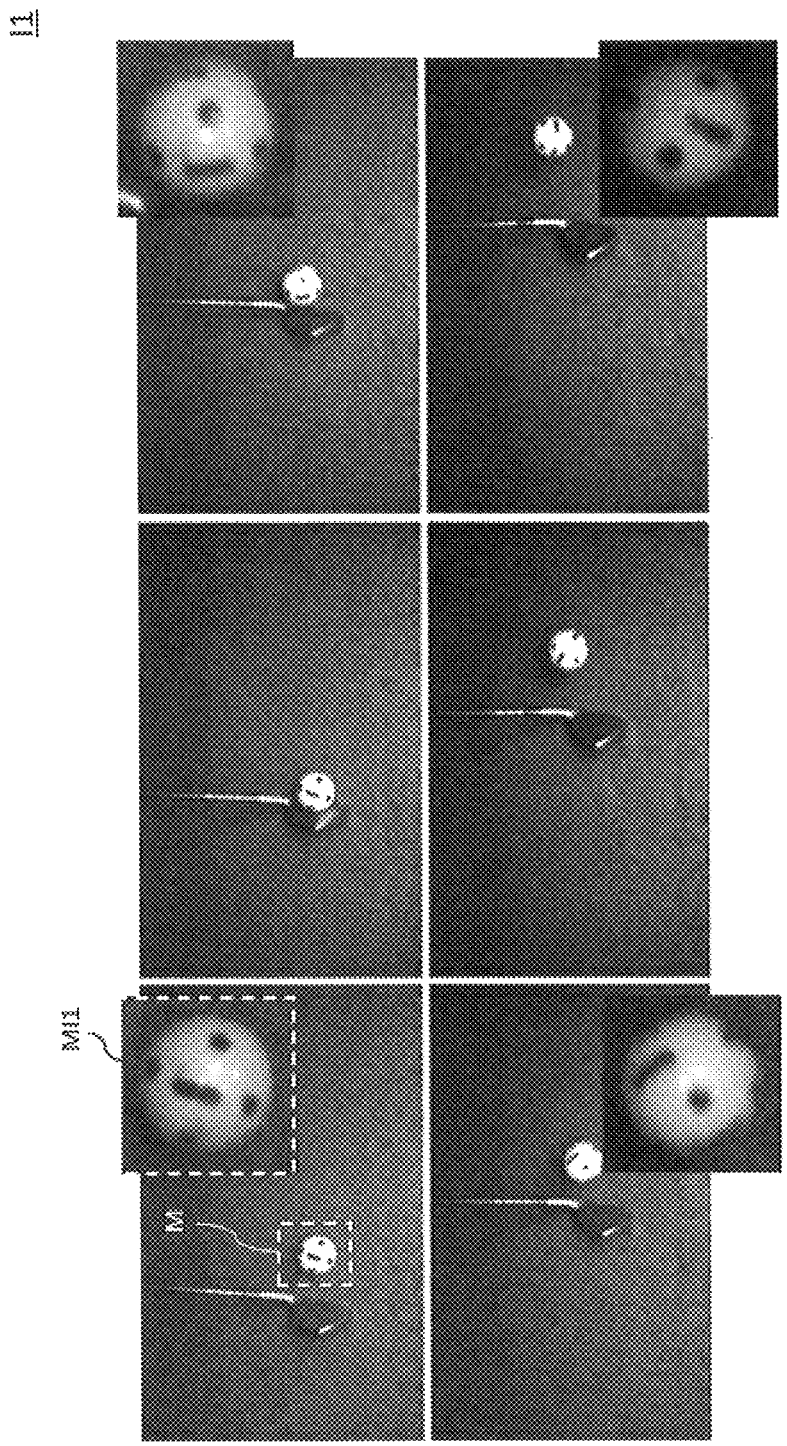
FIGS. 8a to 8c are drawings to explain a step to analyze a ball spinning using marks MD1 and ML1 on the golf ball B according to one embodiment of the present invention.
Figure 8B:
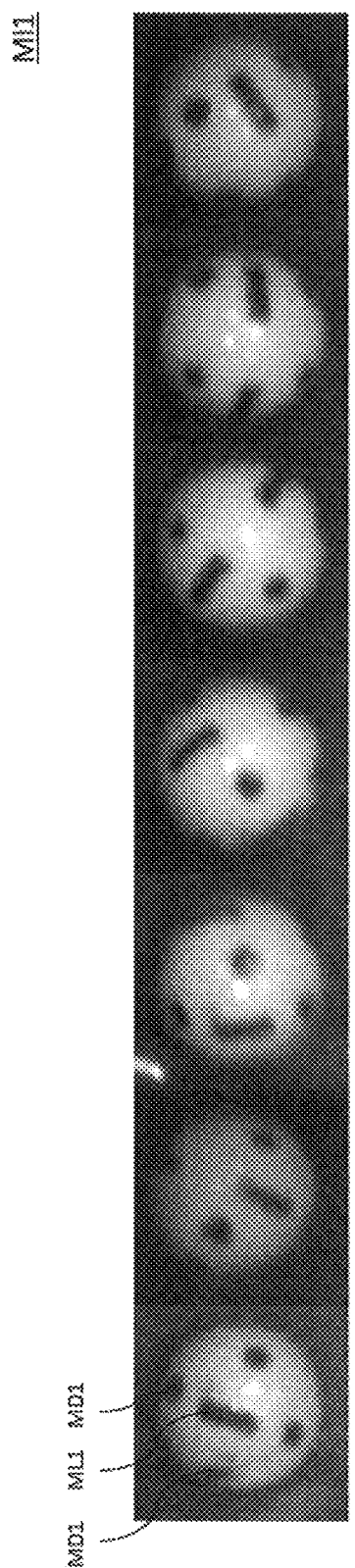
Figure 8C:
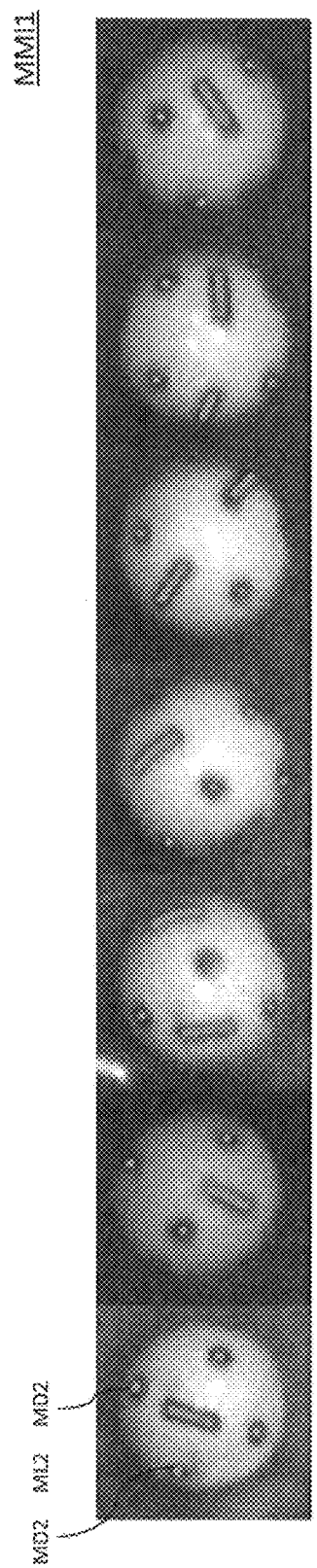

FIGS. 8a to 8c are drawings to explain a step to analyze a ball spinning using the marks on the golf ball B according to one embodiment of the present invention.

For analyzing the ball spinning, the golf ball B used in this system 10 and the method M10 may comprise at least one of mark on an outer surface of the golf ball B. The mark is shown differently in one side of the golf ball B from the other side from any angle. Thus, at least one of arrangement, shape, and color of the mark are shown differently between one side and the other side. For example, referring to FIGS. 8a to 8c, the golf ball B may comprise at least one of dot type mark MD1 and at least one of line type mark ML1 which have a different arrangement from any angle.

FIG. 8a shows images I1 and magnified images MI1 of a pixel area of the golf ball B taken from the third camera C3. Referring to FIG. 8a, positions of the marks MD1 and ML1 are changed in every frame as the golf ball B progresses.

FIG. 8b shows magnified images MI1 in consecutive manner, representing position variations of the marks MD1 and ML1 on the golf ball B. Referring to FIG. 8b, the ball spinning analysis software 207 can calculate a spin direction, a spin speed, and other physical parameters based on the variations of the marks MD1 and ML1.

FIG. 8c shows additional mark-up images MMI1 of the magnified images MI1 in FIG. 8b so that the marks MD1 and ML1 are clearly shown. Referring to FIG. 8c, the ball spinning analysis software 207 can have a mark-up function which can add and/or modify the mark MD1 and ML1 in magnified images MT1 to be clearer. As the mark MD2 and ML2 in the additional mark-up images MMI1 can be easily detected, the ball spinning analysis may be performed accurately.

Figure 10:
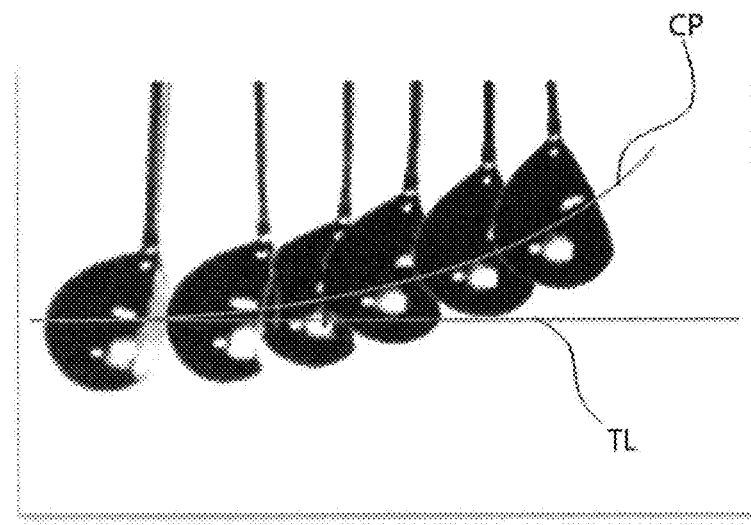
FIG. 10 is a drawing to explain a step to analyze the swing using the processed images PI2 in FIG. 9b.

FIGS. 9a and 9b are drawings to explain a step to analyze swing in FIG. 10 and club face angle in FIG. 11. FIG. 9a shows images I2 of the golf shot taken from third camera C3 from before to after contact between a golf club CB and a golf ball B. FIG. 9b shows processed images PI2 which subtracts the entire pixel area other than that of the golf club from the images I2 in FIG. 9a. Thus, the processed images PI2 is an image extracting a pixel area of the golf club from the images I2 in FIG. 9a.

FIG. 10 is a drawing to explain a step to analyze swing using the processed images PI2 in FIG. 9b. This step may be performed in the swing analysis software 203.

Referring to FIG. 10, a final image representing the club path CP may be produced by overlapping the processed images PI2. The club path CP may be obtained based on a path of the center of the club head. The target line TL is an imaginary line to reach a target hole in the golf course.

An angle between the club path CP and the target line TL can be calculated from before contact to after the contact. Each angle data can be used to determine if the swing is in-to-in, out-to-in, or in-to-out.

Figure 11A:
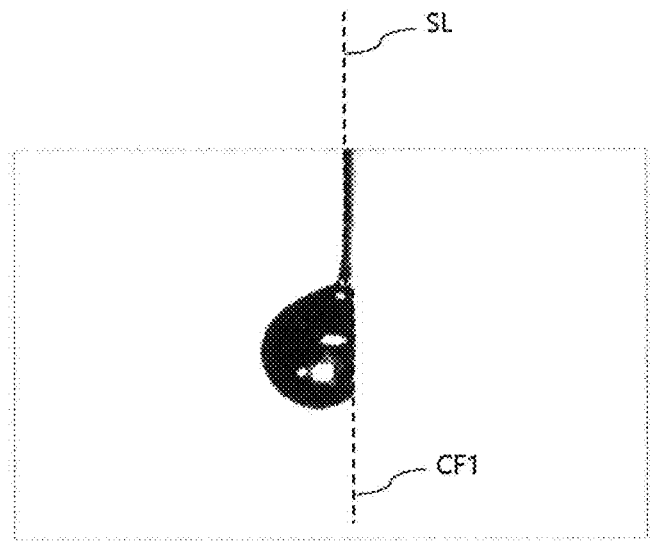
FIGS. 11a to 11c are a drawing to explain a step to analyze a club face angle using the processed images PI2 in FIG. 9b.
Figure 11B:
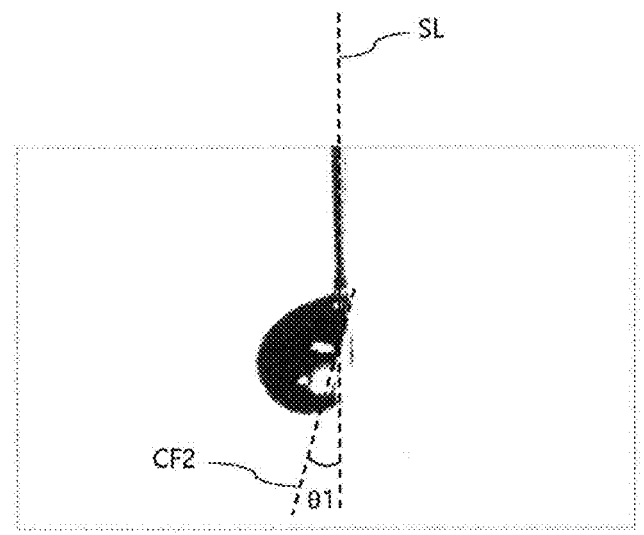
Figure 11C:
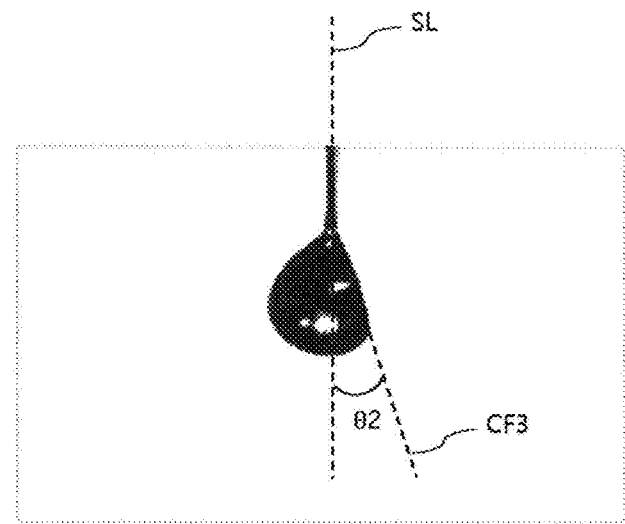

FIGS. 11a to 11c are drawings to explain a step to analyze a club face angle using the processed images PI2 in FIG. 9b. This step may be performed in the swing analysis software 203. The club face angle is referred to as an angle at contact between the golf club and the golf ball. This parameter affects a ball flight.

Referring to FIGS. 11a to 11c, an image when the club head is positioned just before the contact, is used to analyze the club face angle. The club face angle is an angle between a shaft line SL of the golf club and a club face line CF1, CF2, CF3. The club face line CF1, CF2, CF3 is referred to a face line of a head of the golf club.

Referring to FIG. 11a, the shaft line SL and the club face line CF1 is parallel; accordingly, the club face angle is square. Referring to FIG. 11b, a club face angle θ1 between the shaft line SL and the club face line CF1 is certain degree in an open form. Referring to FIG. 11c, a club face angle θ2 between the shaft line SL and the club face line CF1 is certain degree in a closed form.

The data such as image sequences, ball spinning, club face angle, swing can be sent to the simulation software and/or the live replay software S111. The data also can be stored in the memory 400.

After the image capturing steps S107, S113, the image analyzing steps S109, S115, and the data send steps S111, S117, the user can check his or her golf shot through a 3D simulation, a live replay, a swing analysis, and a shot analysis S119, S121, S123, S125.

Figure 12:
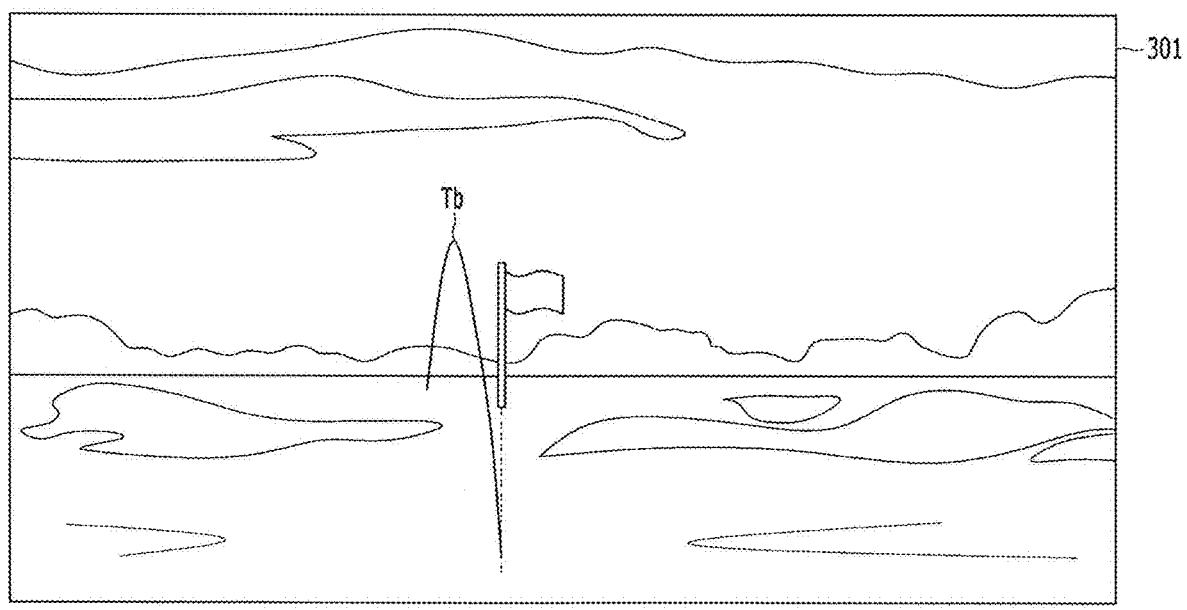
FIG. 12 shows a three dimension golf shot simulation in a golf course on a screen 301 according to one embodiment of the present invention.

FIG. 12 shows a three dimension golf shot simulation in a golf course on a screen 301 according to one embodiment of the present invention. This step may be performed in the simulation software 207. The screen 301 displays the 3D simulation of the golf ball trajectory Tb based on the data obtained from the analysis such as three dimension position and velocity, and horizontal and vertical angle of the golf ball B.

Figure 13:
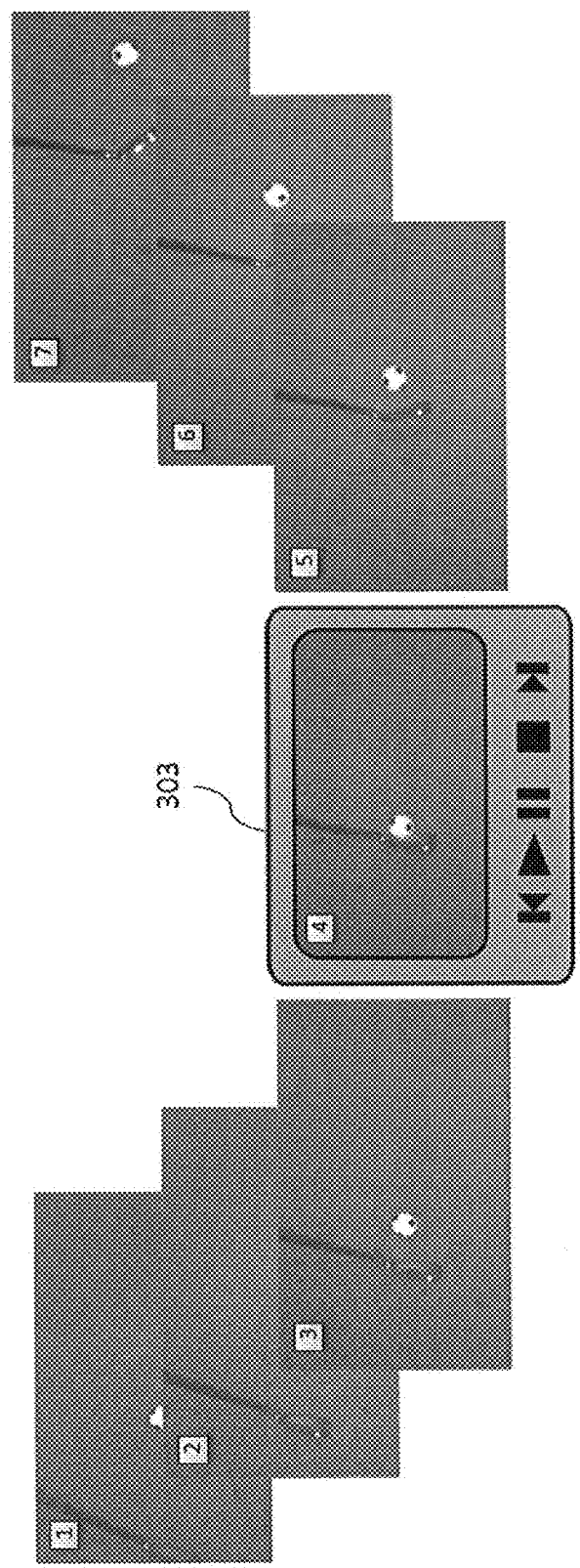
FIG. 13 shows a live replay of a golf shot on a display 303 according to one embodiment of the present invention.

FIG. 13 shows a live replay of a golf shot on the screen 301 or the monitor display 303 according to one embodiment of the present invention. This step may be performed in the live replay software 209. All images captured from the third camera C3 may be displayed as a form of a slow motion video. Therefore, the user can check a relation between the golf ball and the club on each frame, before contact, during the contact, and after contact. The live replay can help the user see the visual data in a real picture form and help to improve his or her skills. After checking the golf shot, the user can try a new golf shot and repeat practice or start a new game S127.

Figure 14:
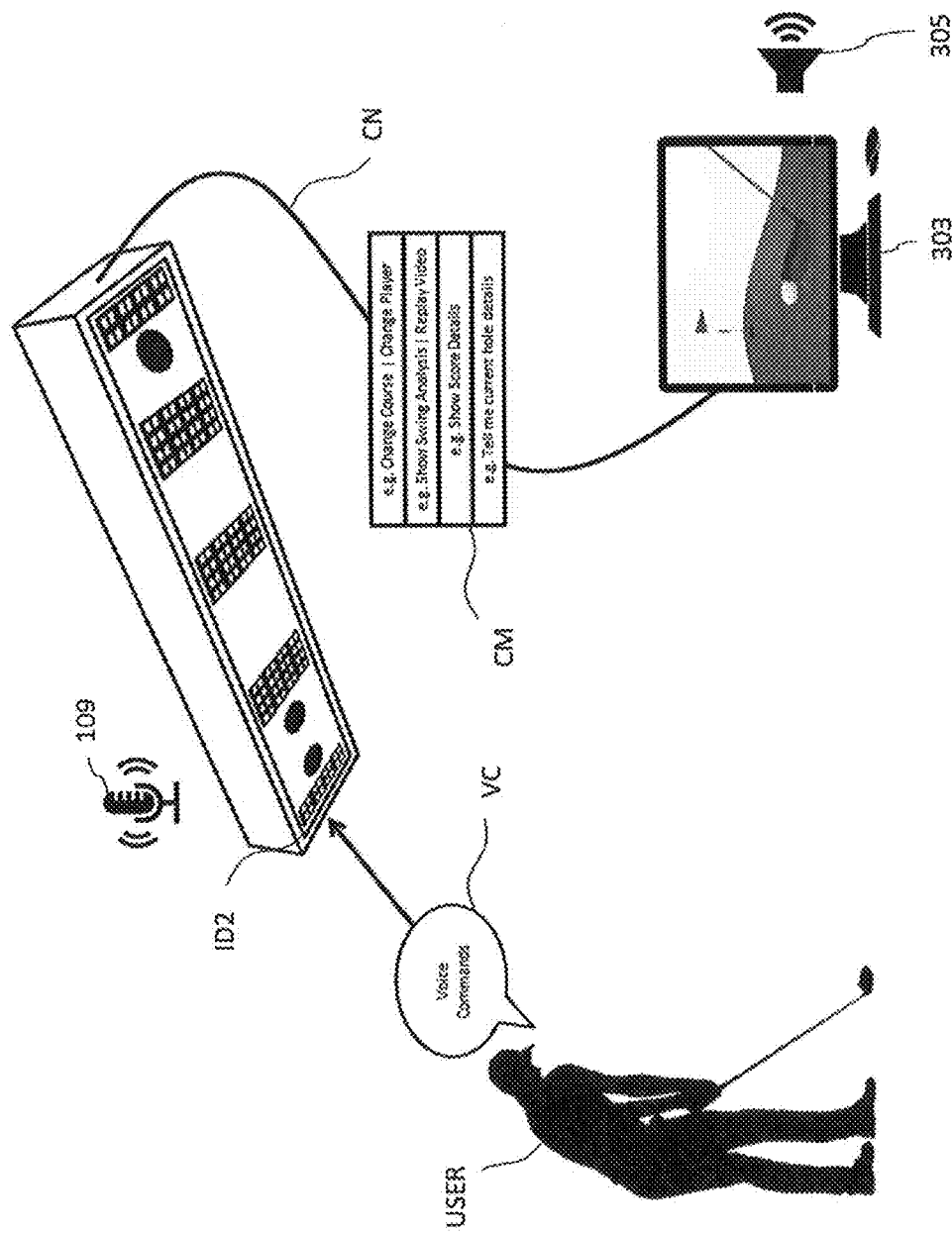
FIG. 14 is a drawing to explain an operation of a voice recognition function of the golf tracking and analysis system 10 according to one embodiment of the present invention.

FIG. 14 is a drawing to explain an operation of a voice recognition function of the golf tracking and analysis system 10 according to one embodiment of the present invention. This step may be performed in the voice recognition software 211.

Referring to FIG. 14, the golf shot tracking and analysis system 10 may provide hands-free command function. When the system 10 receives a voice command VC from the user, the system 10 is recognized the voice command VC through the microphone 109 and the voice recognition software 211. In one embodiment, the microphone 109 may be inbuilt inside an imaging device ID2 but is not limited to.

The controller 200 may answer in forms of audio, video, graphics, or a combination of them through the output devices 300 such as the screen 301, the monitor display 303, and the audio system 305. According to the voice command VC, the system 10 may answer by changing a course or a player, displaying 3D simulation or live replay video, showing/telling analysis, score details, or current hole details.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A system for tracking and analyzing golf shot, the system comprising:
 a light source emitting light having a first wavelength range;
 a plurality of cameras each equipped with a light filter only passing light within the first wavelength range, the cameras comprising:
  a first and a second stereo camera that are positioned in parallel toward the same direction in an imaging device, have the same focal length, and are triggered by single signal, and
  a third camera that is positioned in parallel with the first and the second stereo camera toward the same direction and captures from before to after contact between a golf club and a golf ball;
 a controller having at least one of image analyzing processor; and
 a golf ball including at least one mark on an outer surface, wherein the at least one mark is shown differently between one side of the golf ball from the other side from any angle;
 wherein the image analyzing processor produces:
  a disparity map, a three dimension simulation, and a first motion analysis data including positions, velocities, and angles of the golf shot using images captured from the first and the second stereo camera, and
  image sequences and a second motion analysis data including at least one of ball spinning, club face angle, and swing using images captured from the third camera;
 wherein the disparity map is produced based on a disparity which is a position difference of the golf ball shown in a first image captured from the first stereo camera and a second image captured from the second stereo camera;
 wherein the three dimension simulation is produced by using the disparity map and analysis of a depth from the golf ball to the first and the second stereo camera, wherein the depth is calculated by using the focal length of the first and the second stereo camera, a distance between the first and the second stereo camera, and the disparity;
 wherein the controller analyzes the ball spinning of the golf ball based on position variations of the at least one mark on the outer surface of the golf ball in the images taken from the third camera.

2. The system of claim 1,
 wherein the system further comprises a screen, the screen displays the three dimension simulation, image sequences as live replay, and the first and the second motion analysis data.

3. The system of claim 1,
 wherein the first wavelength range is within infrared light, and
 wherein the light filter is an infrared passing filter.

4. The system of claim 1,
 wherein the light source has a form of a flat panel comprising a plurality of light emitting devices, and
 wherein a direction of the flat panel is parallel to image planes of the cameras.

5. The system of claim 1,
 wherein the cameras are installed at least one place:
  in front of a ball hitting mat, and
  at a top ceiling facing the ball hitting mat in parallel.

6. The system of claim 1,
 wherein the mark is shown differently between one side and the other side by at least one of arrangement, shape, and color of the mark.

7. The system of claim 1,
 wherein the system further comprises a microphone,
 wherein the controller recognizes a voice command input through the microphone by a user and answers through at least one of a screen, an audio system, and other output devices,
 wherein according to the voice command, the system answers by at least one of changing a course, changing a player, displaying 3D simulation, displaying a live replay video, showing at least one of playing analysis, score details, and current hole details.

8. A method for tracking and analyzing golf shot, the method comprising the steps of:
 turning on a light source;
 first capturing a pair of images of the golf shot using a pair of stereo cameras that are positioned in parallel toward the same direction in an imaging device, have a same focal length, and are triggered by single signal;
 first analyzing a disparity, which is a position difference of the golf ball shown in the pair of images from the pair of stereo cameras;
 first producing a disparity map, a three dimension simulation, and a first motion analysis data;
 second capturing an image of the golf shot from before to after contact between a golf club and a golf ball using a single camera that is positioned in parallel with the pair of stereo cameras toward the same direction and;
 second analyzing image sequences captured by the single camera;
 second producing a second motion analysis data including at least one of ball spinning, club face angle, and swing, and
 displaying the three dimension simulation, the image sequence, and the first and the second motion analysis data,
 wherein the step of the first producing the disparity map is performed based on the disparity, wherein the step of the first producing the three dimension simulation includes a step of calculating a depth from the golf ball to the pair of stereo cameras by using the focal length of the pair of stereo cameras, a distance between the pair of stereo cameras, and the disparity;
 wherein the step of second producing includes a step of calculating the ball spinning by using position variations of the at least one mark on an outer surface of the golf ball in the images taken from the single camera, wherein the at least one mark is shown differently between one side of the golf ball from the other side from any angle.

9. The method of claim 8,
 wherein the step of the first producing the disparity map and the three dimension simulation uses a following equation:

$$D = \frac{F \cdot Dcc}{Xl - Xr}$$

wherein D is a vertical distance from the pair of cameras and a golf ball, F is focal length, Dcc is a distance between the pair of cameras, and Xl–Xr is a disparity between the pair of images.

10. The method of claim 8,
wherein the first motion analysis data includes at least one of three dimensional positions, velocities, and angles of the golf shot.

11. The system of claim 8,
wherein the mark is shown differently between one side and the other side by at least one of arrangement, shape, and color of the mark.

12. The method of claim 8,
wherein the step of the second producing the second motion analysis data of the club face angle and the swing includes a step of extracting a processed image representing only a pixel area of the golf club.

13. The method of claim 12,
wherein the club face angle is calculated by measuring an angle between a shaft line of the golf club and a club face line of a head of the golf club using the processed image captured when the head is positioned just before the contact.

14. The method of claim 12,
wherein, in the step of second producing the second motion analysis data of the swing, a type of the swing is determined as in-to-in, out-to-in, or in-to-out by measuring an angle between a path of the golf club and a target line using the processed image from before the contact to after the contact.

15. The method of claim 8,
wherein the steps of the first and the second analyzing and producing are performed through a controller, and
wherein the method further comprises controlling the controller by voice commands,
wherein the step of controlling the controller includes steps of:
  recognizing the voice command input through a microphone; and
  answering to the voice command through at least one of a screen, an audio system, and other output devices, wherein the step of answering is performed by at least one of changing a course, changing a player, displaying 3D simulation, displaying a live replay video, showing at least one of playing analysis, score details, and current hole details, according to the voice command.

16. The method of claim 8,
wherein the light source emits light having a first wavelength range, and
wherein each of the pair of stereo cameras and the single camera is equipped with a light filter only passing light within the first wavelength range.

17. The method of claim 16,
wherein the first wavelength range is within infrared light, and
wherein the light filter is an infrared passing filter.

\* \* \* \* \*